Nov. 17, 1925.

H. J. WILSON 1,561,629

SHOCK ABSORBER FOR MOTOR CARS AND LIKE VEHICLES

Filed Dec. 18, 1924

Inventor:
Henry J. Wilson
By Kent W. Wonnell
Atty.

Patented Nov. 17, 1925.

1,561,629

UNITED STATES PATENT OFFICE.

HENRY JOHN WILSON, OF NEWTON ABBOTT, ENGLAND.

SHOCK ABSORBER FOR MOTOR CARS AND LIKE VEHICLES.

Application filed December 18, 1924. Serial No. 756,795.

*To all whom it may concern:*

Be it known that I, HENRY JOHN WILSON, British subject, of Emmington, Torquay Road, Newton Abbott, Devonshire, England, have invented certain new and useful Improvements in and Relating to Shock Absorbers for Motor Cars and like Vehicles, of which the following is a specification.

This invention relates to improvements in shock absorbers for motor-cars and like vehicles, and refers particularly to shock absorbers of the hydraulic type, in which the reaction or rebound of a vehicle spring is checked through the medium of a member moving against the resistance offered by a fluid in a chamber having one or more small and preferably controllable orifices.

The object of my invention is to provide an improved hydraulic shock absorber which will effectively check and control the rebound of a vehicle spring without interfering with the compression movement of the spring, and in which the degree of checking applied to the spring increases automatically with the initial movement of the spring so that the shock absorber is automatically adjusted to conform with variation in the loading of the spring as for example by a change in the number of passengers carried by the vehicle.

A further object of my invention is to produce a shock absorber which can be manufactured at a low cost, and which will last indefinitely without loss of efficiency and without developing leaks.

Figure 1:
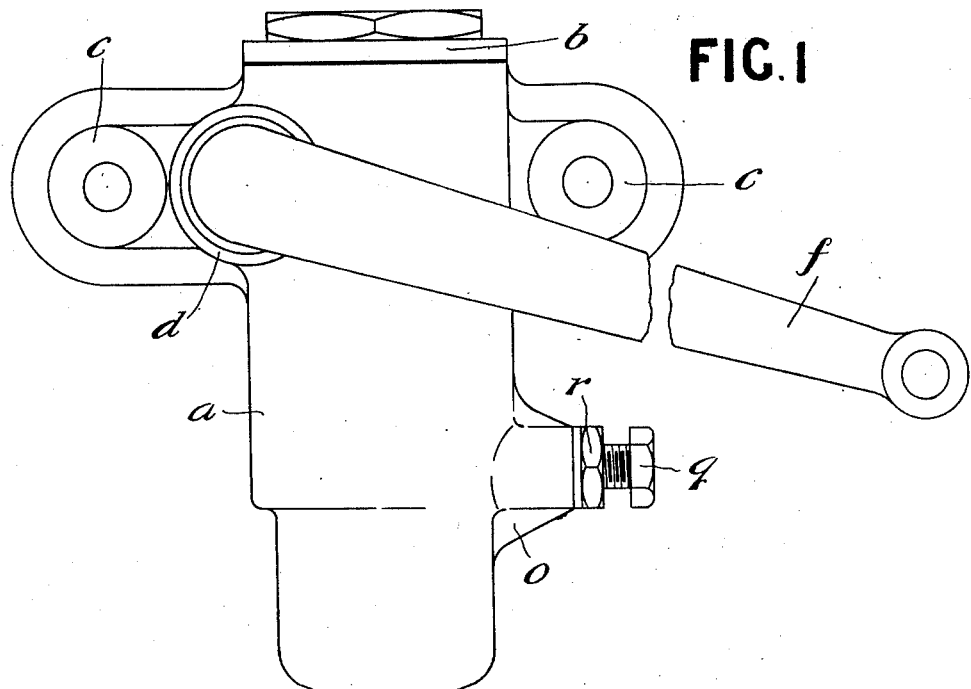

These and other advantages of my improved device are more particularly described below with reference to the accompanying drawings in which: Figure 1 is a front elevation of the complete device.

Figure 2:
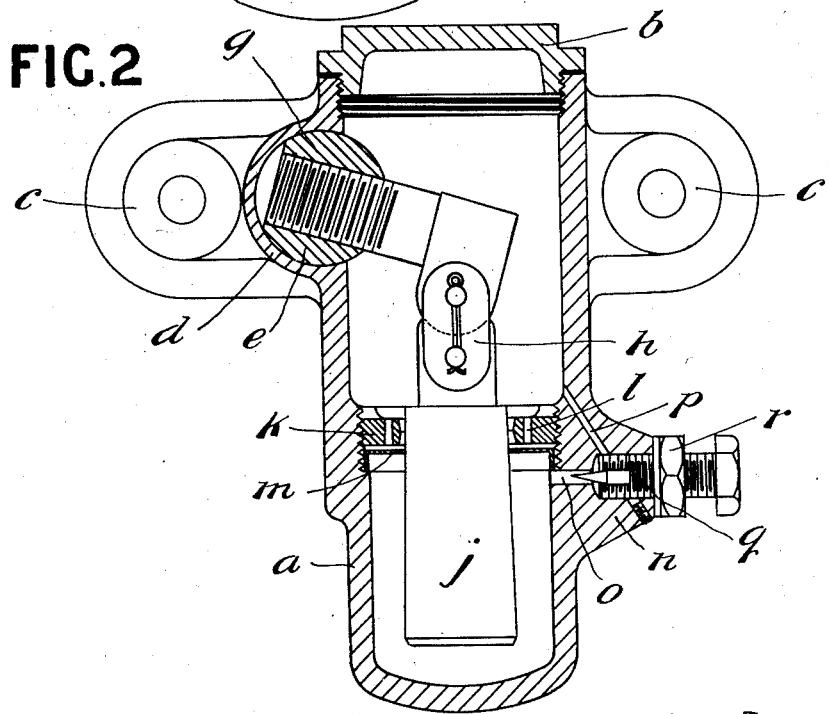

Figure 2, is a vertical section through the body of the device.

In the form illustrated the body of the device consists of a hollow cylindrical casting $a$ closed at the lower end and provided with a detachable screwed cover $b$ at the upper end.

External lugs $c$ are provided for attaching the body to the chassis or axle of a vehicle, and near the upper end of the cylinder is a transverse hollow cylindrical boss $d$ in which works a short cylindrical shaft $e$ of which one end projects from the body and carries a lever $f$ adapted to be attached at its free end to a part of the vehicle which moves under the action of a spring relative to the part to which the body of the device is secured. A diametrical aperture is drilled and tapped through the part of the shaft within the body, and into this aperture is screwed one end of a cranked pin $g$ of which the other end is connected by pivoted links $h$ to the upper end of the plunger $j$. The plunger is a short rod of circular cross-section, but tapering slightly in diameter, the greatest diameter being at the lower end.

The plunger works through a ring $k$ screwed into a shouldered recess in the body and the internal diameter of the ring is such that the lower end of the plunger is just a clearance fit therein, the inner edge of the ring being curved so that there is line contact only between the ring and the plunger. A series of ports $l$ is formed in the ring and these ports are adapted to be obturated on the bottom surface of the ring by a light annular valve plate $m$ to permit passage of fluid through the ports only in the downward direction. A boss $n$ projects from the body below the ring and a radial passage $o$ formed in the boss communicates with an inclined passage $p$ leading into the cylinder above the ring. The radial passage is obturated to any desired extent by a screwed needle valve $q$ controlled from the outside and provided with a lock nut $r$.

The action of the device will be readily followed. On the compression movement of a vehicle spring the plunger $j$ is drawn upwardly and the fluid with which the cylinder is filled passes freely through the ports $l$ in the ring to the underside of the ring.

On the return movement these ports are closed by the valve disc $m$ and fluid can only pass through the annular clearance between the plunger and the ring and through the passages $o$, $p$, in the cylinder walls, and owing to the tapering of the plunger the annular clearance is smallest at the commencement of the stroke and the checking action is then at its maximum.

I claim:—

1. A shock absorbing device comprising a hollow cylindrical body member closed at one end and containing a suitable fluid, means for securing the body member to a part of a vehicle, an internal annular restriction in the bore of the body member, valve controlled passages through the restriction, a tapered plunger working through the restriction and means connecting the plunger to a part of the vehicle having movement relative to the part to which the body member is secured, so that movement of the said part causes reciprocation of the plunger within the body member.

2. A shock absorbing device comprising a hollow cylindrical body member closed at one end and containing a suitable fluid, means for securing the body member to a part of a vehicle, an internal annular restriction in the bore of the body member, valve controlled passages through the restriction, a tapered plunger working through the restriction and means connecting the plunger to a part of the vehicle having movement relative to the part to which the body member is secured so that movement of the said part causes reciprocation of the plunger within the body member, the said means comprising a shaft to which a lever is secured and which works in a transverse cylindrical bore at one side of the body member, an arm projecting from the shaft into the interior of the body member, and pivoted links connecting the free end of the arm to the plunger.

3. A shock-absorbing device, comprising a hollow cylindrical body member closed at one end and containing a suitable fluid, means for securing the body member to a part of a vehicle, an internal annular restriction in the bore of the body member, valve controlled passages through the restriction, a passage in the wall of the body member establishing communication between the parts of the body on opposite sides of the restriction, means for controlling the effective area of the said passage, a tapered plunger working through the restriction, and means connecting the plunger to a part of the vehicle having movement relative to the part to which the body member is secured so that movement of the said part causes reciprocation of the plunger within the body member.

4. A shock absorbing device comprising a hollow cylindrical body member closed at one end and containing a suitable fluid, a removable closure for the other end of the body, means for securing the body member to a part of a vehicle, an internal annular restriction in the bore of the body member, the said restriction being a ring secured within the body member, and having a curved inner edge, valve openings through the ring, an annular valve plate preventing passage of fluid through the openings in one direction, a tapered plunger working through the ring and having its greatest diameter at the end adjacent to the closed end of the cylinder, a lever adapted to be connected to a part of the vehicle having movement relative to the part to which the body member is secured, and means connecting the plunger to the lever so that movement of the lever causes reciprocation of the plunger within the body member.

In testimony whereof I affix my signature.

HENRY JOHN WILSON.